United States Patent

Yates

(10) Patent No.: US 10,569,201 B2
(45) Date of Patent: Feb. 25, 2020

(54) FILTER DEVICE AND METHOD

(71) Applicant: JORDACON ENTERPRISES LLC, Valley Center, CA (US)

(72) Inventor: Kristian W. Yates, Valley Center, CA (US)

(73) Assignee: Jordacon Enterprises LLC, Valley Center, CA (US)

( * ) Notice: Subject to any disclaimer, the term of this patent is extended or adjusted under 35 U.S.C. 154(b) by 0 days.

(21) Appl. No.: 15/937,706

(22) Filed: Mar. 27, 2018

(65) Prior Publication Data

US 2018/0361277 A1  Dec. 20, 2018

Related U.S. Application Data

(60) Provisional application No. 62/520,115, filed on Jun. 15, 2017.

(51) Int. Cl.
*B01D 29/27* (2006.01)
*B01D 29/52* (2006.01)

(52) U.S. Cl.
CPC ............ *B01D 29/27* (2013.01); *B01D 29/52* (2013.01); *B01D 2201/0423* (2013.01); *B01D 2201/12* (2013.01)

(58) Field of Classification Search
CPC ............................... B01D 29/27; B01D 29/52; B01D 2201/0423; B01D 2201/12
USPC ................... 210/232, 448, 450, 451; 55/361, 55/374–378, 381
See application file for complete search history.

(56) References Cited

U.S. PATENT DOCUMENTS

| 90,107 A | * | 5/1869 | Kimball .................. 229/5.7 |
| 3,067,504 A | | 12/1962 | Lubben et al. |
| 3,853,509 A | | 12/1974 | Leliaert |
| 4,098,177 A | | 7/1978 | Olney et al. |
| 4,187,091 A | | 2/1980 | Durre et al. |
| 4,304,579 A | | 12/1981 | Granville et al. |
| 4,617,122 A | | 10/1986 | Kruse et al. |
| 4,622,148 A | | 11/1986 | Willinger |
| 4,783,258 A | | 11/1988 | Willinger et al. |
| 4,906,265 A | * | 3/1990 | Berfield ............... A47L 7/0028 493/186 |

(Continued)

FOREIGN PATENT DOCUMENTS

WO  2016-182362 A2  11/2016

OTHER PUBLICATIONS

High Flow Flexible Filter Media Cup, Marine Depot website, [retrieved on Dec. 6, 2018], retrieved from the Internet <https://www.marinedepot.com High_Flow_Flexible_Filter_Media_Cup_4_inch_Sea_Foam_White_Filter_Sock_Mechanical_Filter_Media-Filter_Media_Cup_Rimer_Rimer_Machine_Shop_LLC-6V3465-FIFMMEFS-vi.html>.

(Continued)

*Primary Examiner* — Madeline Gonzalez
(74) *Attorney, Agent, or Firm* — Procopio Cory Hargreaves and Savitch LLP

(57) ABSTRACT

A sock or bag-type liquid filtering device for use in filtering liquids such as water to remove debris includes a sock or bag of disposable filter material having a rim releasably secured to a two part filter holder. In one embodiment, the holder is designed to engage in an opening of a fish tank filter plate with the filter bag extending through the opening. A first holder part or flanged ring engages inside the rim of the bag and a second holder part or retainer ring engages over the flanged ring and bag rim. In one example the retainer ring is designed for snap engagement over the flanged ring with gripping formations on at least one of the parts, and the bag rim is gripped between the rings.

12 Claims, 9 Drawing Sheets

(56) References Cited

U.S. PATENT DOCUMENTS

| | | | |
|---|---|---|---|
| 5,211,846 A | 5/1993 | Kott et al. | |
| 5,531,892 A | 7/1996 | Duffy | |
| 5,746,792 A | 5/1998 | Clements et al. | |
| 6,143,106 A | 11/2000 | Shane | |
| 6,189,438 B1 | 2/2001 | Bielfeldt et al. | |
| 6,279,570 B1 | 8/2001 | Mittelstadt et al. | |
| 6,706,085 B2 | 3/2004 | Gerakios et al. | |
| 8,262,907 B1 | 9/2012 | Hudson et al. | |
| 2005/0055989 A1* | 3/2005 | Morgan | B01D 29/27 55/379 |
| 2014/0260145 A1 | 9/2014 | Nhem et al. | |

OTHER PUBLICATIONS

Red Sea Reefer Filter Media Cup, Marine Depot website, [retrieved on Dec. 6, 2018], retrieved from the Internet <https://www.marinedepot.com/Red_Sea_Reefer_Filter_Media_Cup_Mechanical_Filter_Media-Red_Sea-RS2177-FIFMME-vi.html>.

International Search Report and Written Opinion for International Patent Application No. PCT/US2018/028535 dated Nov. 16, 2018 in 13 pages.

AquaMaxx 200 Micron Filter Sock, Marine Depot website, [retreived on May 15, 2018], retrieved from the Internet <https://www.marinedepot.com/AquaMaxx_200_Micron_Filter_Sock_Filter_Sock_Mechanical_Filter_Media-AquaMaxx-UJ4111-FIFMMEFS-vi.html>.

Filter Media Cup—4 In—Sea Foam White, Marine Depot website, [retrieved on May 15, 2018], retrieved from the Internet <https://www.marinedepot.com/Filter_Media Cup_4_inch_Sea_Foam_White_Mechanical_Filter_Media-Filter_Media_Cup_Rimer_Rimer_Machine_Shop_LLC-6V58752-FIFMME-vi.html>.

Crud Catcher 4" Filter Sock Replacement, Little Ocean website, [retrieved on May 15, 2018], retrieved from the Internet <https://www.littleocean.co.uk/shop/crud-catcher-4-filter-sock-replacement.html>.

* cited by examiner

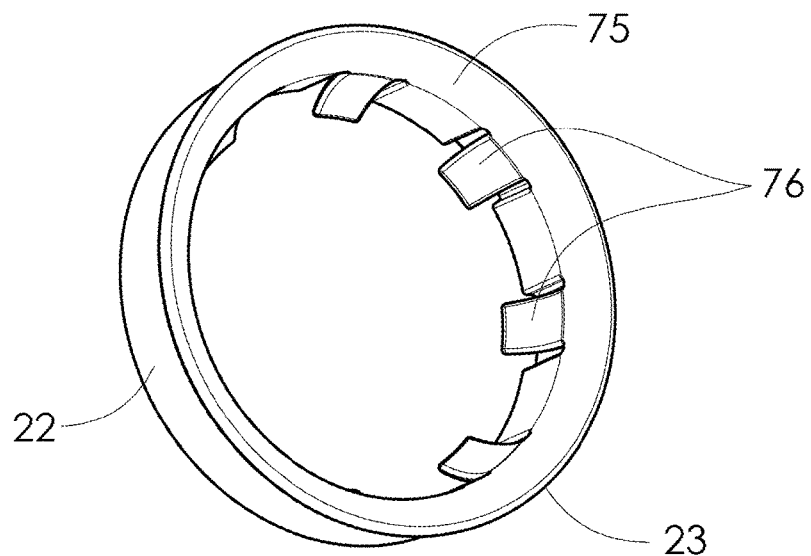
FIG. 17
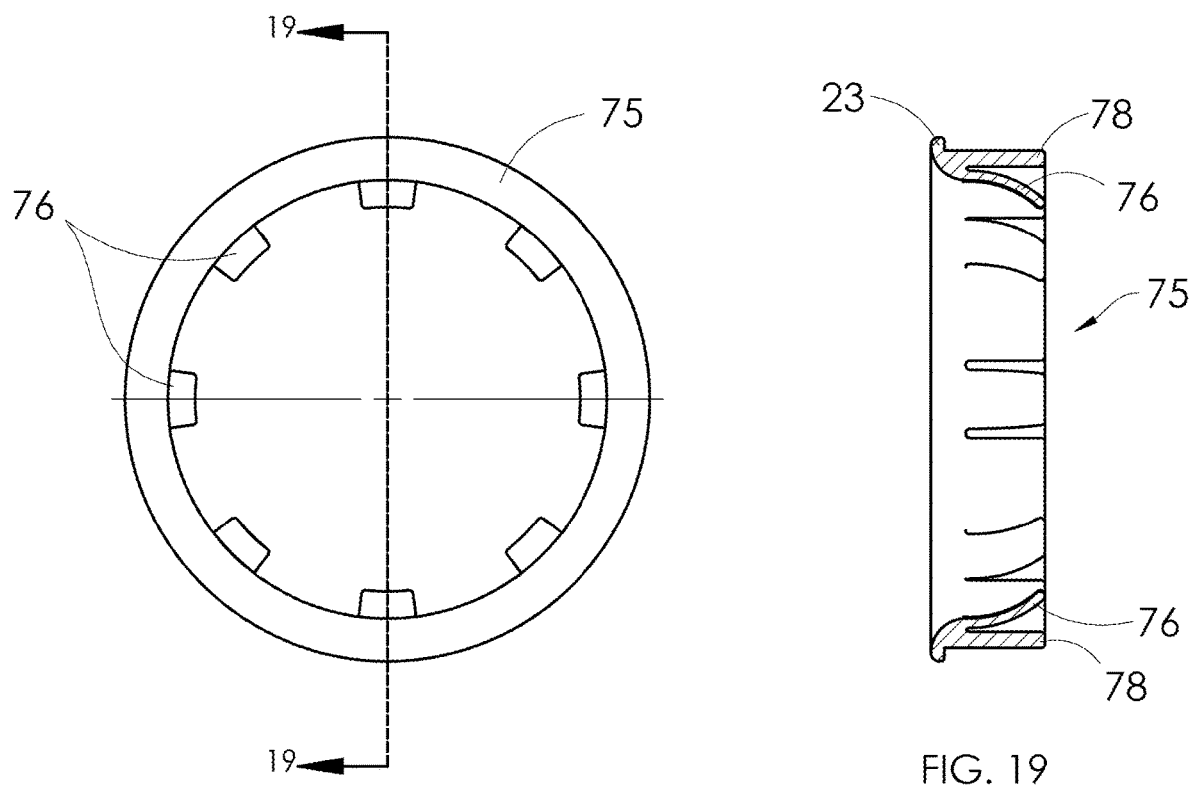
FIG. 18
FIG. 19

FILTER DEVICE AND METHOD

BACKGROUND

Related Field

The subject matter discussed herein relates generally to filter devices and is particularly concerned with sock or bag-type filter devices for fish tanks, aquariums and the like.

Related Background

Existing sock or bag-type filter devices for aquariums are made of a suitable filter material and are releasably mounted in an aquarium filter system through an opening in a sump filter plate. The typical filter material is a cloth or felt material. Dirty water pumped from the tank flows through the sock filter device so that debris is retained in the sock. These filters must be removed periodically for cleaning purposes so that they do not become too clogged to restrict flow through the sock. The cleaning procedure involves first cleaning out the accumulated solid debris and then washing or laundering the sock. This procedure is messy and time consuming.

SUMMARY

In one embodiment, a filter device comprises a two part filter holder and a disposable, replaceable filter sock or bag of a disposable filter medium having a rim portion gripped between opposing surfaces of the two parts of the filter holder. A release mechanism between the parts of the filter holder allows for separation of the parts to release the filter sock after use. The used filter sock is then discarded and replaced with a new sock.

In one embodiment, the filter sock is pre-formed, and the filter sock includes an outer edge that is folded to create a pre-formed flange, which is heat bonded to prevent filter media from unfolding.

In one embodiment, a method of assembling the filter device includes releasably engaging the retainer ring over the first ring with the peripheral rim portion of the disposable filter sock gripped between opposing surfaces of the rings and the first end face of the retainer ring seated against the flange of the first ring with the pre-formed flange there between.

In one embodiment, the retainer ring has a smooth inner surface and the first ring has an outer surface having projections configured for gripping the peripheral rim portion of the filter sock between the first ring and inner surface of the retainer ring, and the method further comprising sliding the peripheral rim portion of the filter sock over the projections of the outer surface of the first ring, and then releasably engaging the retainer ring over the first ring with the peripheral rim portion of the disposable filter sock gripped between opposing surfaces of the rings.

In one embodiment, the device is assembled by placing a first annular part or ring of the filter holder over a cylindrical mandrel until a flange at one end of the first ring is seated on an annular flange at a first end of the mandrel, positioning a central part of a piece or sheet of the filter media over the opposite, second end of the cylindrical mandrel, then sliding a second part or retainer ring of the filter holder over the end of the mandrel and filter media and over the first holding part so as to form the sock over the mandrel. Opposing outer and inner surfaces of the holder parts are designed for releasable engagement to grip the rim of the filter media sock, and may be in snap engagement in one embodiment. The sheet of filter medium may comprise a disc having a small circular groove or indent formed or embossed in a central portion of the disc which is dimensioned for engagement over the second end of the mandrel.

BRIEF DESCRIPTION OF THE DRAWINGS

The details of various embodiments can be gleaned in part from a study of the accompanying drawings, in which like reference numbers refer to like parts, and in which:

FIG. 17 is a perspective view of a modified retainer ring with flexible tabs, for use in place of the retainer ring of the device of FIGS. 1 to 5;

FIG. 18 is a top view of the modified retainer ring of FIG. 17;

FIG. 19 is a cross-section view of the retainer ring on the lines 19-19 of FIG. 18.

DETAILED DESCRIPTION

Figure 1:
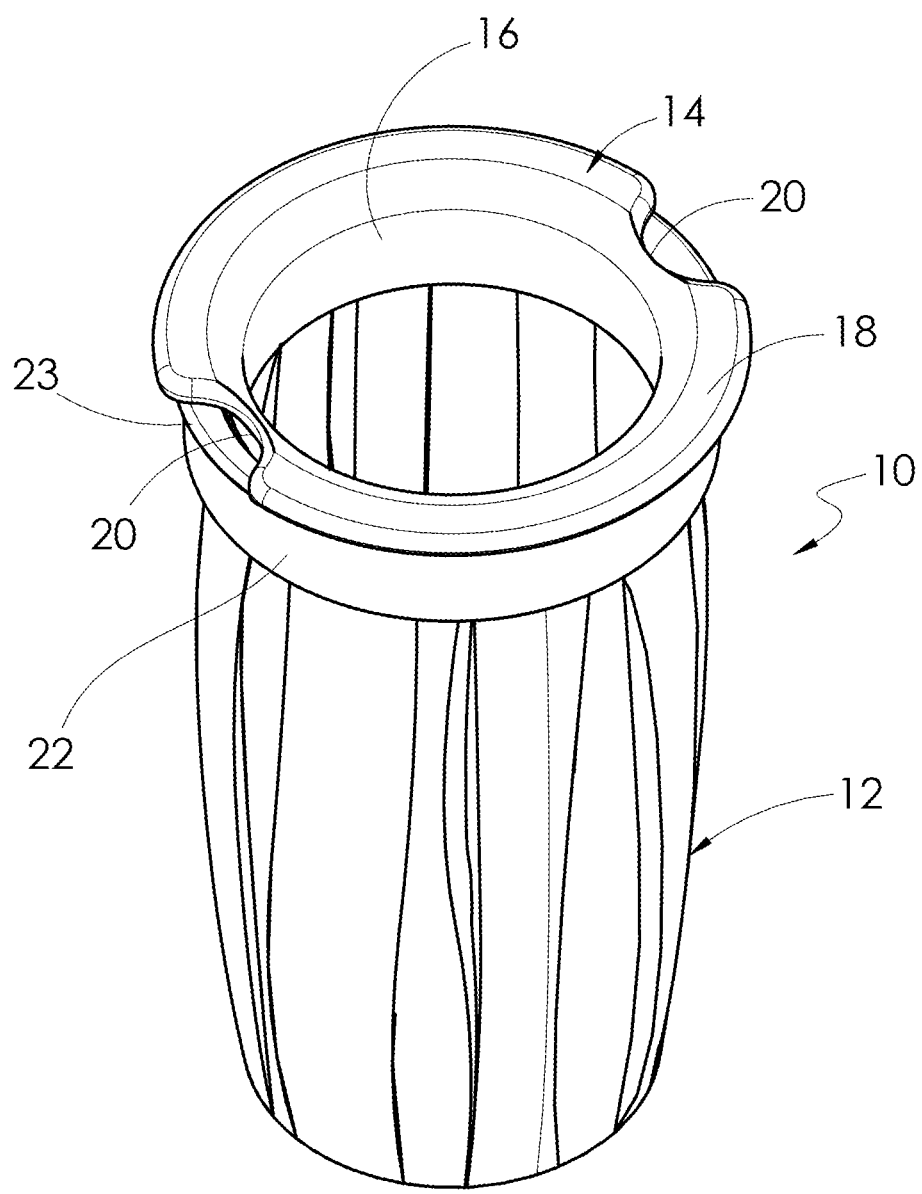
FIG. 1 is a top perspective view of a first embodiment of the filter device in an assembled condition.

Certain embodiments as described herein are generally concerned with a filter device for an aquarium or the like which includes a disposable filter element and with a method of assembling the filter device.

The subject matter described herein is taught by way of example implementations. Various details have been omitted for the sake of clarity and to avoid obscuring the subject matter. The examples shown in the drawings and described below are directed to devices, systems and methods for providing sock or bag type filter devices for fish tanks, aquariums and the like. Features and advantages of the subject matter should be apparent from the following description.

After reading this description it will become apparent to one skilled in the art how to implement the invention in various alternative embodiments and alternative applications. However, all the various embodiments of the present invention will not be described herein. It is understood that the embodiments presented here are presented by way of an example only, and not limitation.

Figure 2:
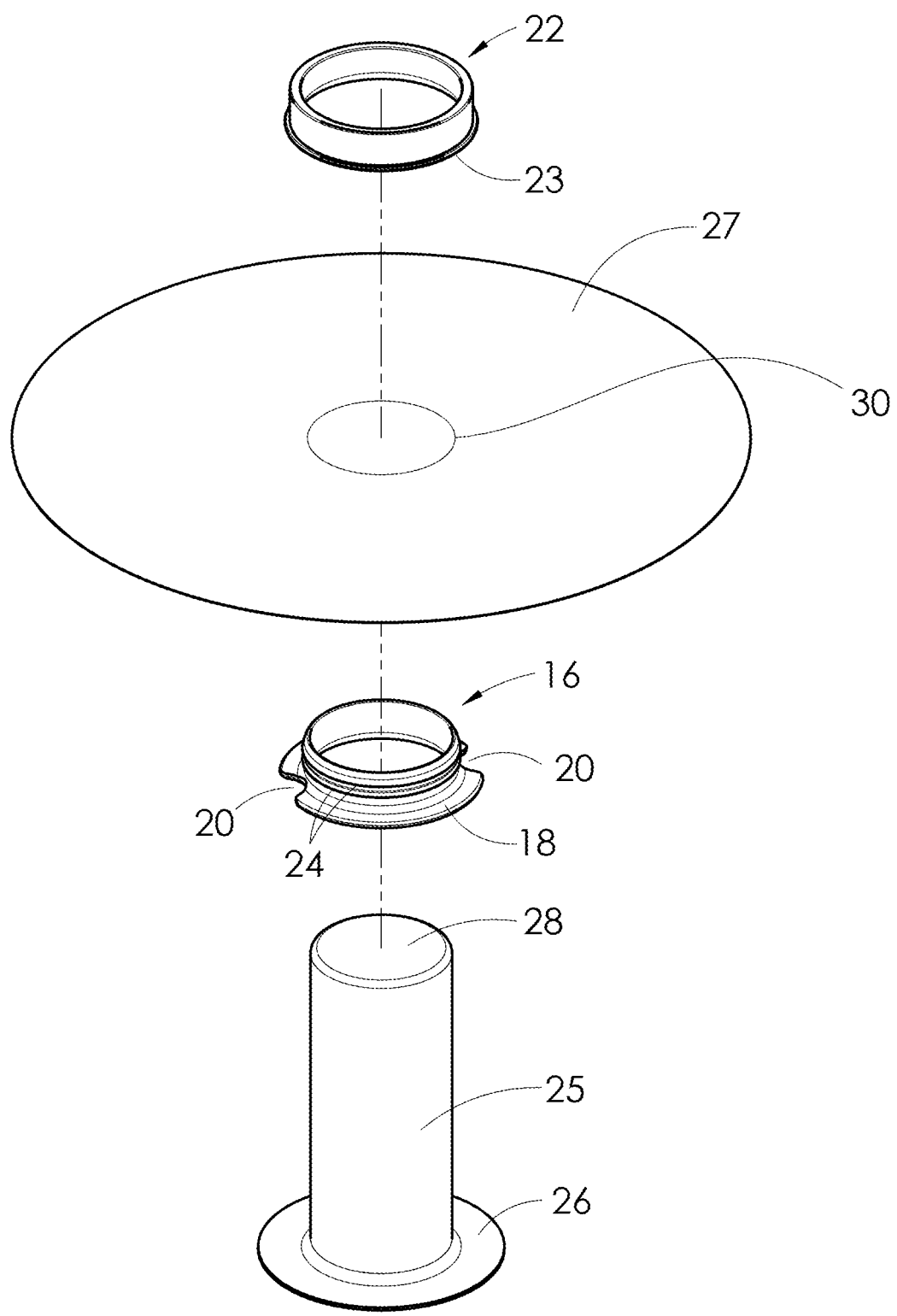
FIG. 2 is an exploded view of the parts of the filter device prior to assembly with the filter media in its original disc shape before assembly, and also illustrating an assembly mandrel used for shaping the filter media into a desired sock or bag-like shape.
Figure 3:
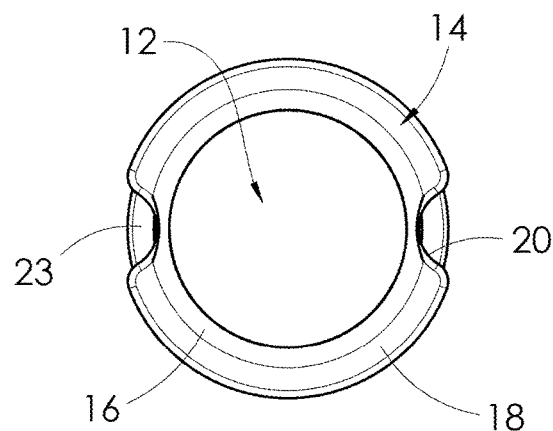
FIG. 3 is a top plan view of the assembled filter device, illustrating two thumb cut-outs used for disassembly.
Figure 4:
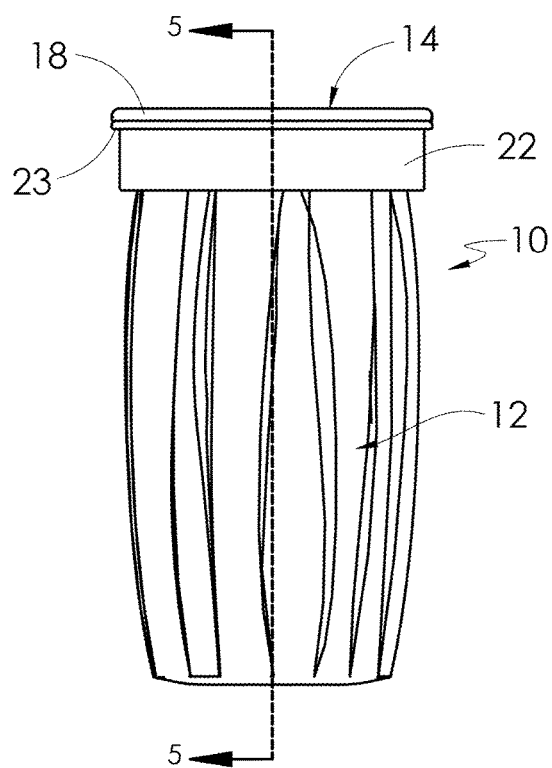
FIG. 4 is a front elevation view of filter device.
Figure 5:
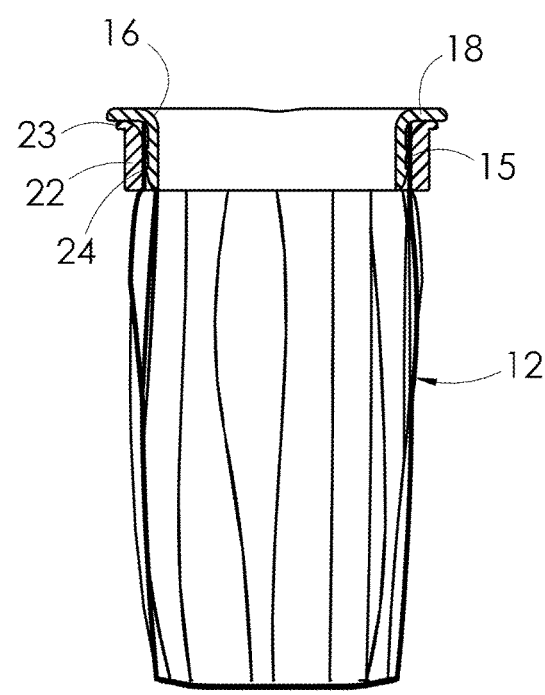
FIG. 5 is a cross-section view of the assembled device on the lines 5-5 of FIG. 4, illustrating retention of the rim of a disposable filter bag or sock between two parts of the filter holder.
Figure 6:
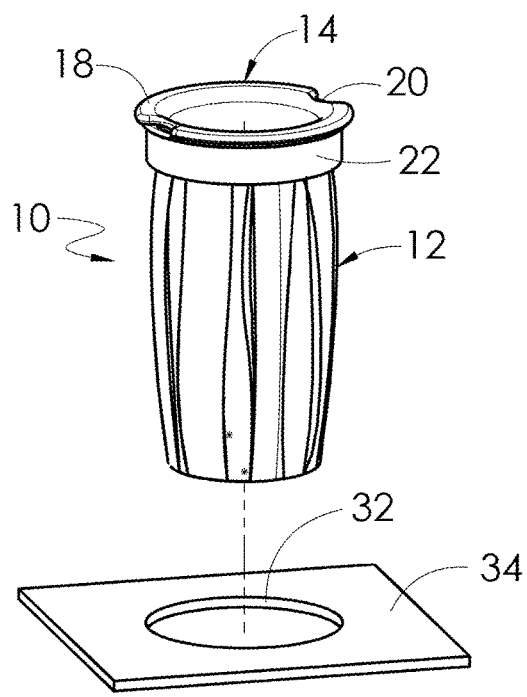
FIG. 6 illustrates the filter device positioned over an opening in a sump filter plate.
Figure 7:
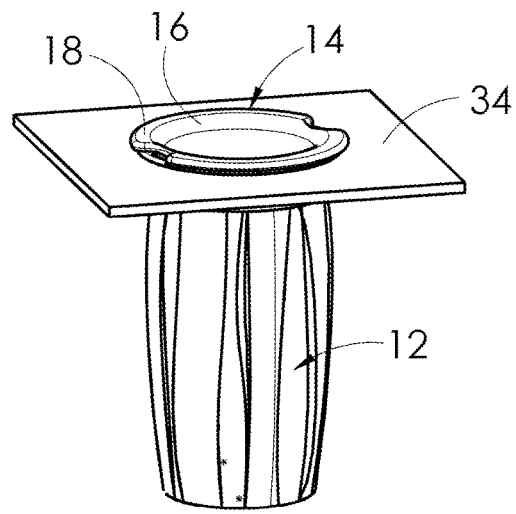
FIG. 7 illustrates the filter device installed in the sump's filter plate.
Figure 8:
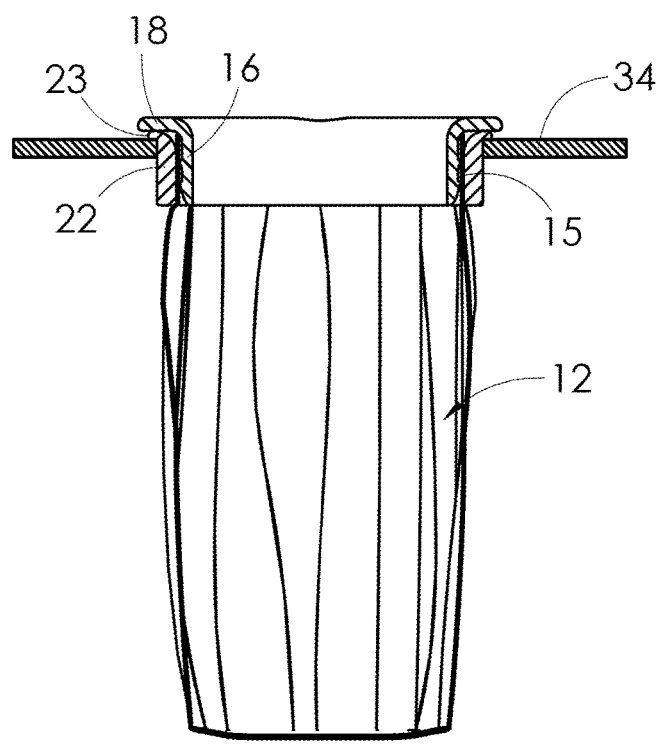
FIG. 8 is a cross-section view similar to FIG. 5 illustrating the lip of the retainer ring seated against the top surface of the sump's filter plate.

FIGS. 1 to 5 illustrate a first embodiment of a filter device 10 with a disposable filter sock or bag 12, with FIG. 2 illustrating a method of assembly of the filter device and FIGS. 6 to 8 illustrating installation of the filter device on a filter plate of a fish tank or aquarium sump. Filter device 10 basically comprises filter sock or bag 12 and a two part holder or retainer assembly 14 for releasably holding a rim portion 15 of the bag 12. The filter bag may be of any suitable sheet-like disposable filter material or media, such as paper or a polymer or plastic filter material for higher strength. In one embodiment, the filter material has a micron rating from 50 to 200 and a thickness of approximately 0.010".

The two part holder or retainer assembly 14 in one embodiment comprises a first part or flanged ring 16 having a peripheral flange 18 at one end, and a second part or retainer ring 22 designed for telescopic or sliding engagement over ring 16. Flange 18 has two diametrically opposite cut outs 20. An outer surface of the first ring 16 has a plurality of barbs, ridges or teeth 24, as best seen in FIG. 2. The inner surfaces of first ring 16 and retainer ring 22 in one embodiment are smooth cylindrical surfaces, with the inner diameter of ring 22 being larger than the inner diameter of ring 16 and designed to be a press or snap fit over the ring 16 with a peripheral portion of a filter bag or sock gripped between opposing surfaces of the rings, as described in more detail below. Retainer ring 22 has an annular lip 23 at its upper end as viewed in FIG. 1. Alternative retainer or snap engagement formations may be provided on the outer surface of ring 16 in other embodiments. Unlike existing non-disposable filter sock devices for water tanks and aquariums which have a flexible flange, the flanged ring 16 of this device is rigid, and may be formed of any suitable rigid material such as metal or rigid plastic material.

FIG. 2 is an exploded view which illustrates how filter bag 12 is formed and secured to holder or retainer assembly 14 in one embodiment of the filter device. In one embodiment, the filter media or material is originally in the shape of a flat disc or circular sheet 27 of appropriate dimensions for forming into a bag shape over a cylindrical mandrel 25 provided for that purpose. Mandrel 25 has an enlarged base or rim 26 at a first end, and a second end 28. The cylindrical mandrel has a diameter slightly less than the diameter of the central opening in flanged ring 16. In one embodiment, there is an embossed circle 30 at the center of disc 27 to help a user in centering disc 27 over the second end 28 of the mandrel 25 as illustrated in FIG. 2.

In one embodiment of a method of forming filter device 10, the user first slides the flanged ring 16 over the mandrel until flange 18 sits flush with the base or rim 26 of the mandrel. The filter media or disc 27 is then centered on the second end 28 of the mandrel. The user then slides the retainer ring 22 over filter disc or sheet 27 and the mandrel, simultaneously folding the filter media down over the outer cylindrical surface of the mandrel as it is captured between the inner face of the retainer ring and outer face of the mandrel, until the retainer ring together with any captured filter media engages over the ring 16 and the end face or lip 23 of ring 22 engages the flange 18. At this point, the bag is formed and there is an interference fit between the retainer ring, captured rim portion 15 of the bag 12, and ring 16, as best seen in FIG. 5. The assembled filter device 10 can then be removed from mandrel 25. The barbs or projections 24 on ring 16 resist or prevent the captured rim portion of the bag from pulling free of the holder or retainer assembly 14, even when the bag is filled with water during filtration.

The assembled filter device 10 is then positioned over an opening or bore 32 in a filter plate 34 of a sump of a water tank or aquarium, and the bag is inserted through bore 32 until the lip 23 of retainer ring 22 is seated flush with the filter plate, as best illustrated in FIG. 8. Water from the tank is then pumped through bag 12, with particulate material captured in the bag and cleaned water returned to the tank in the usual manner. When it is time to replace the filter bag, the filter device is removed from opening 32 and water filling the bag is allowed to drain from the bag. The interference fit between the retainer ring, rim portion of the filter media or bag 12, and the ring 16 is designed to be of sufficient strength to support the weight of water in the bag as it drains out and prevent or resist the captured rim portion 15 from pulling out.

Once the water has drained out, the user holds the edge of flange 18 while placing their thumbs at the two relief cuts or indents 20, to push against the exposed part of the lip 23 of retainer ring 22. The thumbs are then used to press the retainer ring free from flange 18, releasing the used and soiled filter bag 12 so that it can be discarded. The smoother interior surface of retainer ring 22 allows it to slide free of the flanged ring 16 with little effort. The two parts of the filter holder are then engaged with a new piece or sheet of filter media in the same way as described above in connection with FIG. 2.

Figure 9:
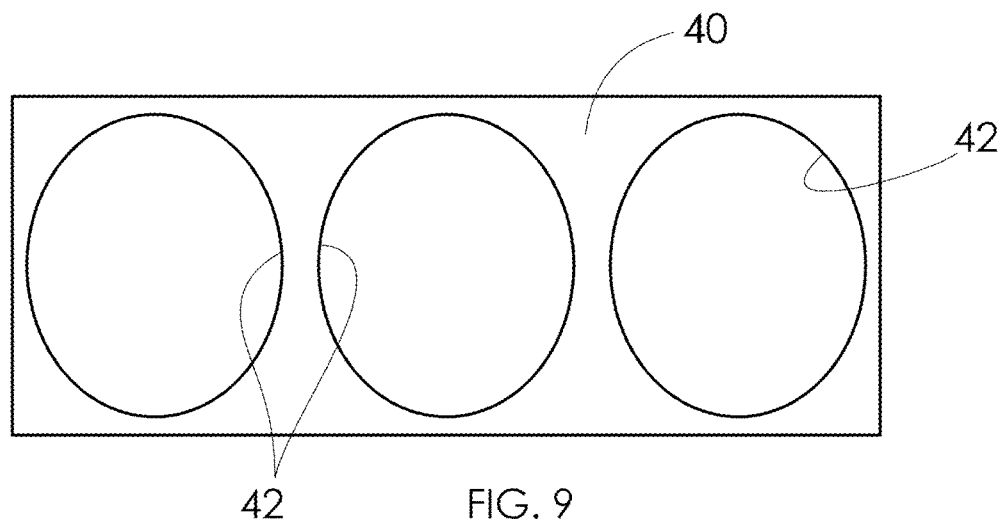
FIG. 9 is a top plan view of a known sump filter plate design which uses oval shaped holes to allow three standard filter socks to fit within the limited space of the sump.
Figure 10:
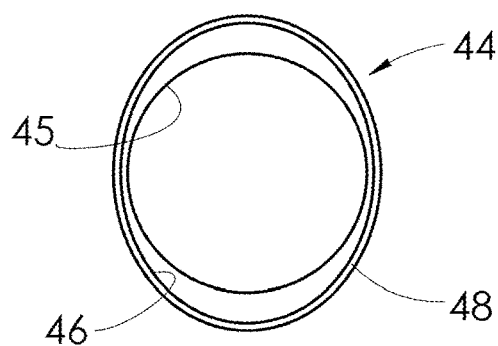
FIG. 10 is a top plan view of a modified retainer ring which has an oval shaped perimeter which fits the oval shaped filter plate of FIG. 7 while still being engageable with the first part or flanged ring of the filter holder of FIGS. 1 to 5.
Figure 11:
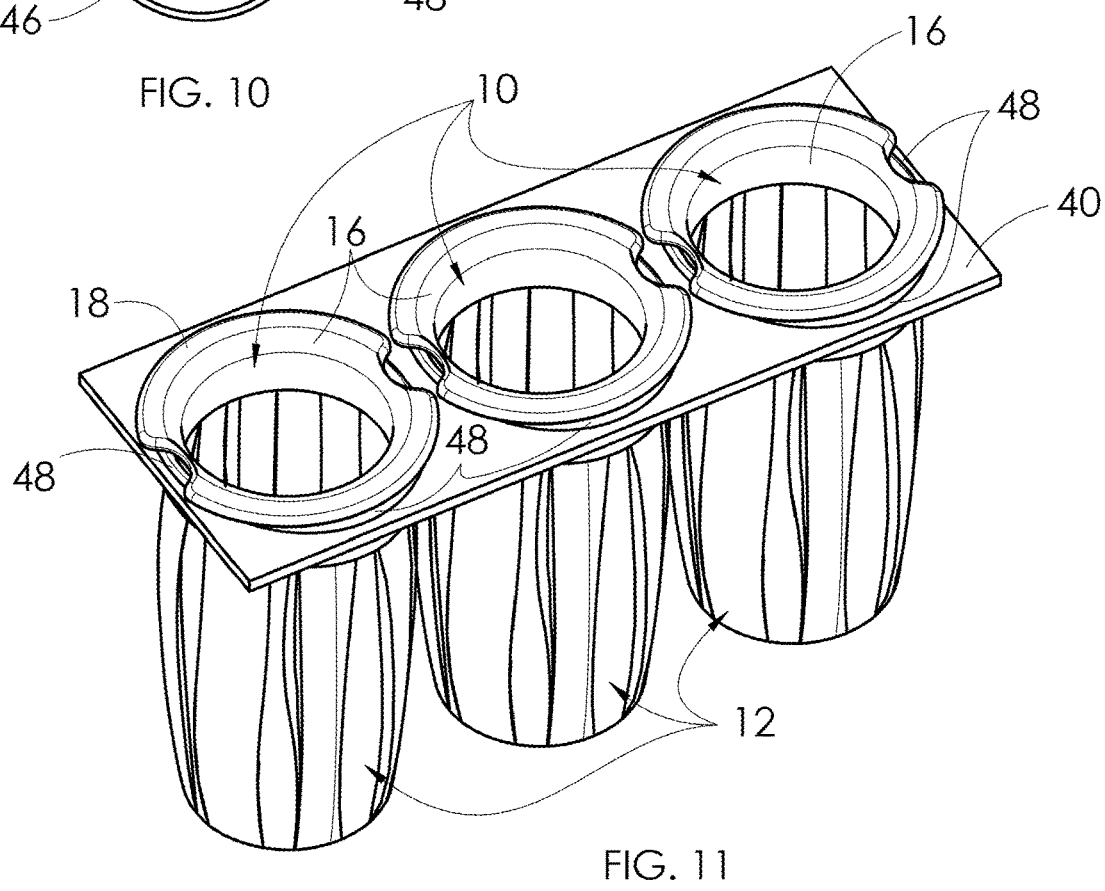
FIG. 11 is a top perspective or isometric view illustrating three filter devices each using the modified retainer ring of FIG. 10 installed in the respective oval openings of the sump filter plate of FIG. 9

FIG. 9 is a top plan view illustrating one known fish tank sump filter plate 40 which uses oval shaped holes 42 oriented as illustrated to allow three standard filter socks to fit within the limited space of the sump. The flanges of standard filter socks are flexible, allowing circular flanges to fit within oval shaped holes 42. However, as noted above, flanged ring 16 of filter device 10 is of rigid material. FIG. 10 illustrates a modified retainer ring 44 which may replace ring 22 of the first embodiment to act as an adapter in order to allow three of the filter devices 10 to be used for filtering water in a fish tank which has a filter plate 40 with three oval openings as illustrated in FIG. 9. Apart from the modified retainer ring 44, all other parts of the filter devices 10 may be the same as described above in connection with FIGS. 1 to 8. Ring 44 has a first end opening 45 which is of circular shape and similar diameter to ring 22, and a second end opening 46 which is of oval shape and matches the dimensions of the openings or holes 42 in filter plate 40. An outwardly projecting rim or lip 48 of oval shape extends around the perimeter of opening 46. In this way, three filter devices 10 with disposable filter bags 12 may be adapted to fit the oval openings 42 of a sump filter plate 40.

Figure 13:
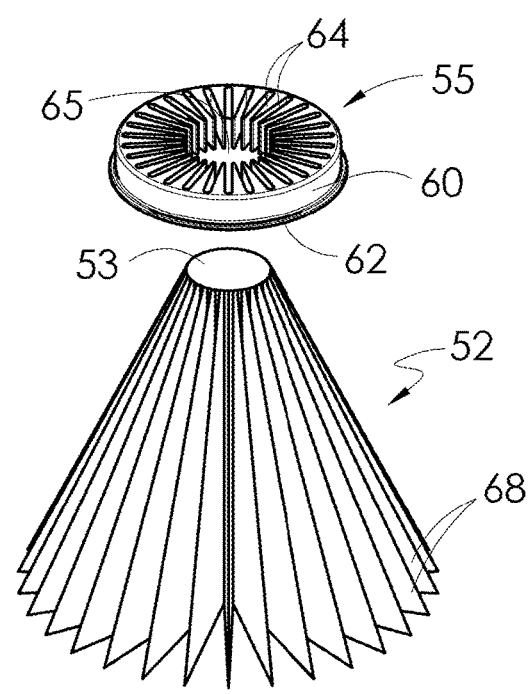
FIG. 13 is a view similar to FIG. 12 illustrating a subsequent stage in assembly of the pleated filter device.
Figure 13:
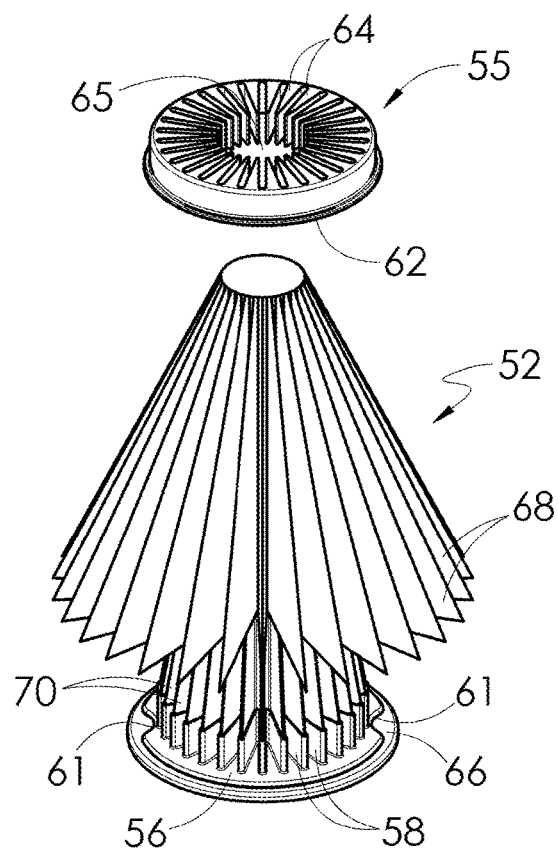
Figure 12:
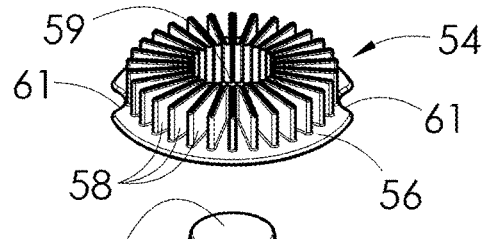
FIG. 12 is an exploded view similar to FIG. 2 illustrating parts of a second embodiment of a filter device with a pleated filter for assembly over a modified mandrel.
Figure 12:
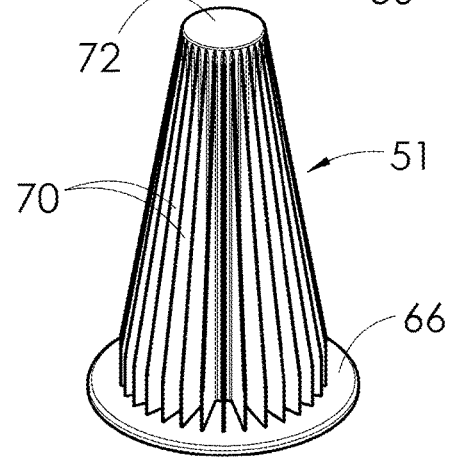
Figure 14:
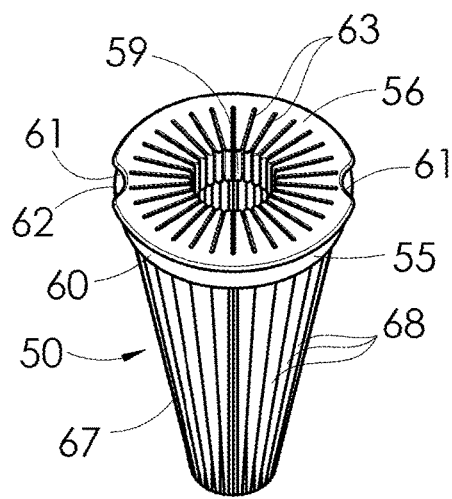
FIG. 14 is a top perspective view illustrating the assembled pleated filter device of FIGS. 12 and 13.

FIG. 12 is an exploded view of parts of an embodiment of a pleated filter device 50 as seen in FIG. 14, which may be assembled using a mandrel 51 similar to the mandrel described above in connection with FIG. 2 but of different shape and dimensions. In this case the filter media may also be a disc 27 of the same material described above in connection with FIGS. 1 to 8, but in the illustrated embodiment is a pre-pleated filter 52 having pre-formed pleats or ribs 68 as illustrated in FIGS. 12 and 13. Filter 52 is similar to a pleated coffee filter and may be of any of the filter materials described above in connection with the first material. This alternative may help to ensure that the pleats in the formed filter bag are more uniform.

As in the previous embodiment, filter device 50 includes a first holder part or ring 54 and a retainer ring 55, but the first part 54 in this embodiment comprises a base plate 56 with a plurality of spaced ribs 58 arranged in an annular array surrounding a central opening 59 in base plate 56, with slots 63 in the base plate extending outwards from opening 59 as seen in FIG. 14, in alignment with the respective ribs. A pair of diametrically opposed notches 61 is formed in the outer peripheral edge of base plate 56. The retainer ring 55 has an outer sleeve or ring 60 with an annular lip or rim 62 and a plurality of spaced teeth 64 projecting inwardly from ring 60 and surrounding a central opening 65. In this embodiment, rigid mandrel 51 has a plurality of tapered ribs 70 of pleat-like shape extending along the length of the mandrel from smaller diameter end 72 to an enlarged base 66, forming a mandrel of pleated, generally conical shape. The cross-sectional shape of ribs 58 at the larger end of the mandrel is arranged for sliding engagement with the slots and ribs of first ring 54 and with the ribs or teeth 64 of retainer ring 55.

In this embodiment, the central opening of ring 54 is first engaged over mandrel 51 with slots 63 aligned with respective ribs 70, and moved down until the base plate 56 engages base 66, as seen in FIG. 13. The central flat portion 53 of filter 52 is then engaged over the end 72 of the mandrel with pleats 68 engaging over ribs 70 as illustrated in FIG. 13. The user then slides the retainer ring 55 over filter 52 with the teeth 64 aligned with the spaces between pleats 68, capturing pleats in the filter between the teeth 64 and the ribs 70 on the outer face of the mandrel. Once the retainer ring reaches the ring 54, the teeth 64 engage between ribs 58 and wedge a rim portion of the filter media against the sides of the retainer teeth, creating an interference fit and securing the retainer ring to the first ring or member 54. The rings and attached filter then form a filter device 50 as seen in FIG. 14, which can be removed from the mandrel and engaged in a sump filter plate opening in the same manner as described above in connection with FIGS. 6 to 8. After a period of continuous use and accumulation of debris in the filter bag, the first ring 54 is separated from retainer ring 55 using cut-outs 61 in the same way as described above in connection with the previous embodiment, and the filter bag is discarded. A new pleated filter bag 52 is then attached to the retainer ring and first ring or holder device using mandrel 51 in exactly the same way as described above in connection with FIGS. 12 and 13.

Figure 15:
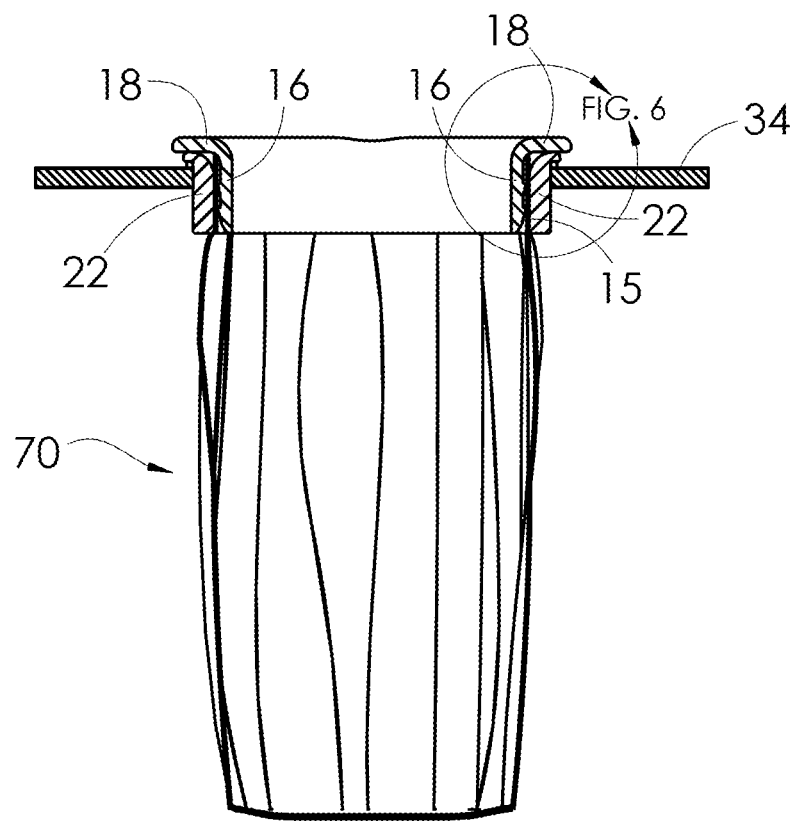
FIG. 15 is a cross-section view similar to FIG. 8 but illustrating a modified embodiment which uses an O-ring between the lip of the retainer ring and the face of the filter plate.
Figure 16:
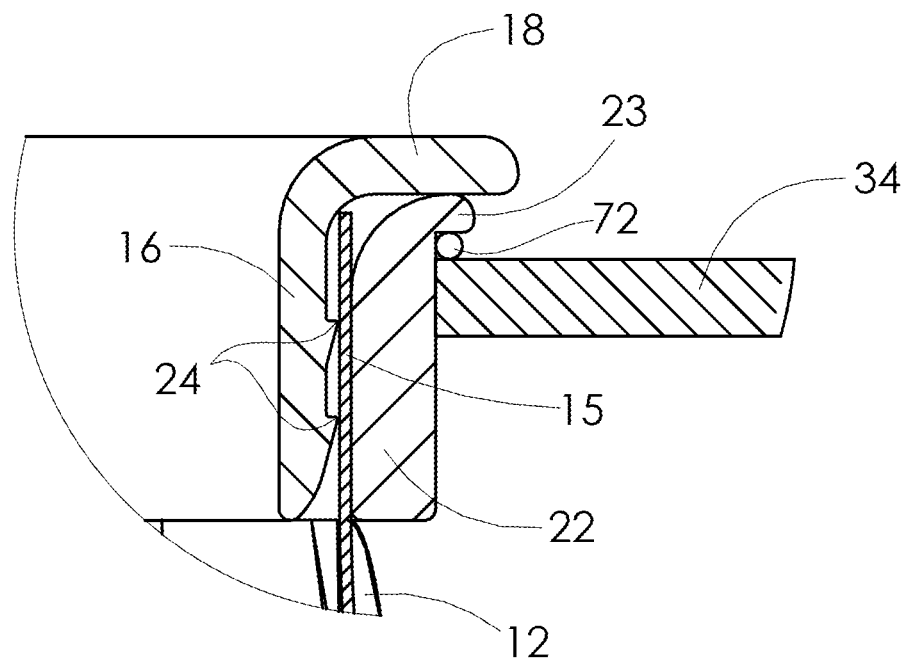
FIG. 16 is an enlarged view of the circled part of the assembly in FIG. 15 illustrating the O-ring seal.

FIGS. 15 and 16 illustrate a filter device 70 which is a modification of the embodiment of FIGS. 1 to 8 and like reference numbers are used for like parts as appropriate. The only difference between this embodiment and filter device 10 is the addition of an O-ring seal 72 between the lip 23 of the retainer ring and the opposing face of the filter plate 34, as best seen in the enlarged cross-sectional view of FIG. 16. This helps to restrict or prevent unfiltered water from leaking past the filter assembly. Alternatively, a gasket or lip seal could be used. In an alternative arrangement, the seal may be located between the outer diameter of the retainer ring and the inner diameter of the filter plate opening 32.

FIGS. 17 to 19 illustrate a modified retainer ring 75 which may be used in place of the retainer ring of FIGS. 1 to 8. Ring 75 has an annular lip or rim 23 at a first end, as in the first embodiment. Additionally, a series of spaced, inwardly biased flexible tabs 76 are provided around a portion of ring 75 extending up to the second end 78 of the ring. Tabs 76 are used to hold filter media 27 against mandrel 25 during assembly of the filter device 10 and also help to ensure that the outer rim or perimeter 15 of the formed filter sock or bag is urged against the barbs 24 of ring 16 between the ring 16 and retainer ring 75.

The items illustrated in FIG. 2 or 12 may be provided as a kit for sale to owners of aquariums or fish tanks, including multiple filter discs 27 or pleated filters 52 for use when a used filter bag 12 or 50 needs to be replaced. The filter discs or pleated filters may also be sold separately.

Figure 20:
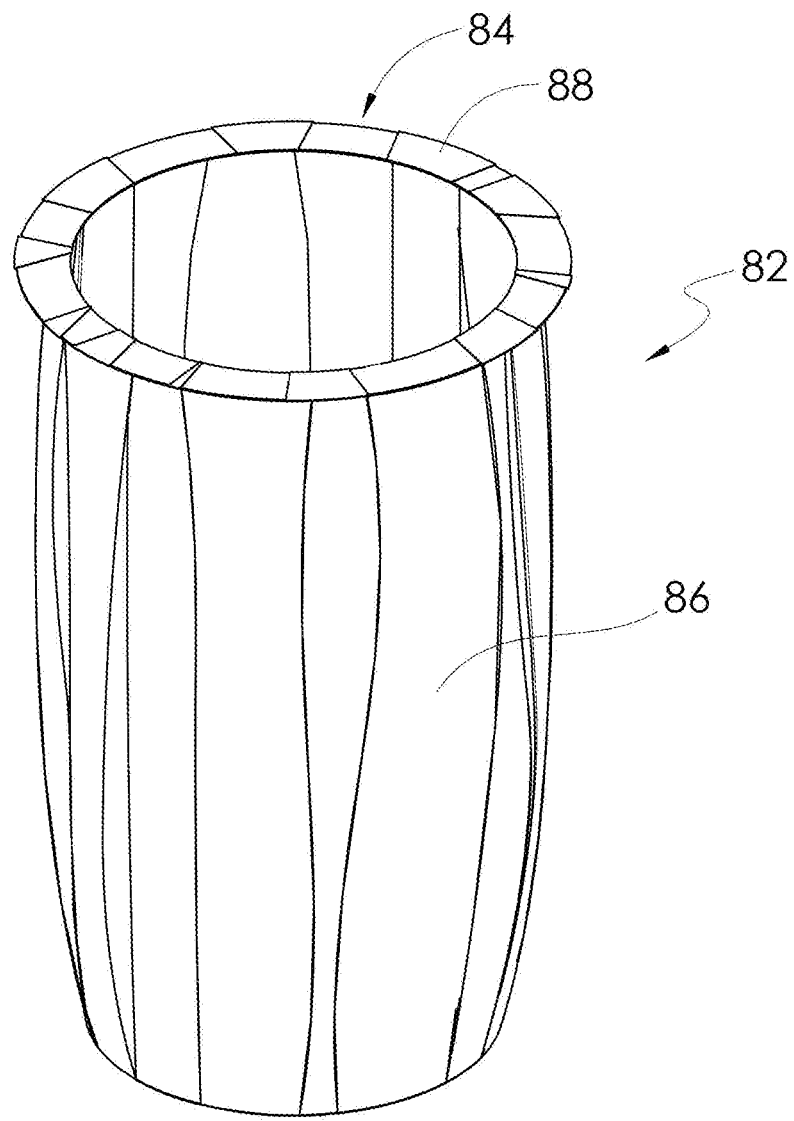
FIG. 20 is a top perspective view of another embodiment of a disposable filter bag or sock of the filter device.

With reference to FIG. 20, another embodiment of a disposable filter bag or sock 82 of the filter device 10 will be described. The disposable filter bag or sock 82 is similar to the disposable filter bag or sock 12 shown and described with respect to FIGS. 1-8, except that the disposable filter bag or sock 82 uses filter media that is factory formed or pre-formed and does not require the user/customer to form the media over the mandrel 25 as shown and described with respect to FIG. 2, further simplifying installation. An outer edge 84 of filter disc 86 is folded to create a pre-formed flange 88. The pre-formed flange 88 is heat bonded which prevents the filter media from unfolding. The user/customer creates the final filter device assembly by placing the pre-formed disposable filter bag or sock 82 over the barbs 24 of the flanged ring 16 and then sliding the retaining ring 22 over the filter media of the disposable filter bag or sock 82. Thus, the flanged ring 16 and retainer ring 22 do not change in the embodiment of FIG. 20.

The filter device of the foregoing embodiments is much easier, cleaner and less messy to use than existing re-usable filter socks for fish tank or aquarium filter systems, and may also be usable in other applications where liquid filtration is needed. In each embodiment, a used filter sock or bag can be quickly and easily detached from the retainer flange assembly to which the rim of the bag is secured, simply by snapping the retainer ring and flange apart via the finger or thumb indents. A new filter device can then be assembled easily using the technique described in connection with FIGS. 2 and 12. Thus, the flanged ring and retainer ring are re-usable and only the inexpensive, disposable filter sock or bag is discarded after use.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments.

What is claimed is:

1. A filter device comprising:
   a two part filter holder; and
   a filter sock of disposable material depending from the filter holder and having a peripheral rim portion gripped by the filter holder;
   a first part of the filter holder comprising a first ring having a central opening and first and second ends, and an outwardly projecting flange at the first end of the ring; and
   a second part of the filter holder comprising a retainer ring having a central opening, a first end face and a second end;
   wherein the retainer ring is releasably engaged over the first ring with the peripheral rim portion of the disposable filter sock gripped between opposing surfaces of the rings and the first end face of the retainer ring seated against the flange of the first ring, the retainer ring having a smooth inner surface and the first ring has an outer surface having projections configured for gripping the peripheral rim portion of the filter sock between the first ring and inner surface of the retainer ring, the projections circumscribing the entire outer periphery of the first ring.

2. The filter device of claim 1, wherein the retainer ring comprises an outer ring member and a plurality of inwardly directed, pleat-forming teeth extending inwardly from the outer ring member and configured to engage and form pleats in a disposable filter material and the first ring has a base plate and a plurality of ribs extending from the base plate and configured to engage between respective teeth of the retainer ring with filter material at the peripheral rim of the filter sock retained between the respective teeth and ribs.

3. The filter device of claim 1, wherein the first ring is rigid.

4. The filter device of claim 1, wherein the retainer ring includes an outwardly projecting rim of oval shape adapted to fit in an oval opening of a sump filter plate.

5. The filter device of claim 1, wherein the retainer ring includes an outer diameter and the filter device further includes a seal adapted to be located between the outer diameter of the retainer ring and an inner diameter of a filter plate opening.

6. The filter device of claim 1, wherein the retainer ring includes a series of spaced, inwardly biased flexible tabs.

7. The filter device of claim 1, wherein the filter sock is pre-formed.

8. The filter device of claim 7, wherein the filter sock includes an outer edge that is folded to create a pre-formed flange, which is heat bonded to prevent filter media from unfolding.

9. A method of assembling the filter device of claim 8, comprising:
   releasably engaging the retainer ring over the first ring with the peripheral rim portion of the disposable filter sock gripped between opposing surfaces of the rings and the first end face of the retainer ring seated against the flange of the first ring with the pre-formed flange there between.

10. The method of assembling the filter device of claim 9, wherein the retainer ring has a smooth inner surface and the first ring has an outer surface having projections configured for gripping the peripheral rim portion of the filter sock between the first ring and inner surface of the retainer ring, and the method further comprising sliding the peripheral rim portion of the filter sock over the projections of the outer surface of the first ring, and then releasably engaging the retainer ring over the first ring with the peripheral rim portion of the disposable filter sock gripped between opposing surfaces of the rings.

11. The filter device of claim 1, wherein the outer surface of the first ring has an outer periphery and the projections include a plurality of projections longitudinally spaced on the outer periphery of the first ring.

12. A filter device comprising:
   a two part filter holder; and
   a filter sock of disposable material depending from the filter holder and having a peripheral rim portion gripped by the filter holder;
   a first part of the filter holder comprising a first ring having a central opening and first and second ends, and an outwardly projecting flange at the first end of the ring; and
   a second part of the filter holder comprising a retainer ring having a central opening, a first end face and a second end;
   wherein the retainer ring is releasably engaged over the first ring with the peripheral rim portion of the disposable filter sock gripped between opposing surfaces of the rings and the first end face of the retainer ring seated against the flange of the first ring, and the outwardly projecting flange of the first ring including a periphery with two diametrically opposite cut outs forming two respective open indents along the periphery of the outwardly projecting flange of the first ring.

* * * * *